US009049596B1

(12) United States Patent
Kronrod

(10) Patent No.: US 9,049,596 B1
(45) Date of Patent: Jun. 2, 2015

(54) PREVENTION OF FRAUD IN MOBILE SIM REISSUING VIA KNOWLEDGE BASED AUTHENTICATION

(71) Applicant: EMC Corporation, Hopkinton, MA (US)

(72) Inventor: Boris Kronrod, Netania (IL)

(73) Assignee: EMC Corporation, Hopkinton, MA (US)

( * ) Notice: Subject to any disclaimer, the term of this patent is extended or adjusted under 35 U.S.C. 154(b) by 229 days.

(21) Appl. No.: 13/832,362

(22) Filed: Mar. 15, 2013

(51) Int. Cl.
*H04M 1/68* (2006.01)
*H04W 12/06* (2009.01)

(52) U.S. Cl.
CPC ..................................... *H04W 12/06* (2013.01)

(58) Field of Classification Search
CPC .................................. H04W 8/20; H04W 8/24
USPC ........................................ 455/410, 411, 558
See application file for complete search history.

(56) References Cited

U.S. PATENT DOCUMENTS

| 8,606,267 | B2 | 12/2013 | Chandan et al. | |
| 2009/0305667 | A1* | 12/2009 | Schultz | 455/410 |
| 2013/0304651 | A1* | 11/2013 | Smith | 705/67 |
| 2014/0302778 | A9* | 10/2014 | Cooper | 455/41.1 |

* cited by examiner

*Primary Examiner* — Amancio Gonzalez
(74) *Attorney, Agent, or Firm* — BainwoodHuang

(57) ABSTRACT

An improved technique involves employing knowledge based authentication (KBA) to validate a user trying to reissue a SIM card. Along these lines, when a user goes to a mobile device vendor and requests a reissue of a SIM card, the vendor relays that request to an authentication server which in turn sends KBA questions to the user. The KBA questions are based on data available to the mobile carrier to which the genuine subscriber subscribes. Such data concerns information including calls made and received, amount of minutes and data used in a month, and amount billed in particular months. The vendor honors or denies the request to reissue the SIM card based on the answers submitted by the user to the authentication server.

20 Claims, 3 Drawing Sheets

US 9,049,596 B1

PREVENTION OF FRAUD IN MOBILE SIM REISSUING VIA KNOWLEDGE BASED AUTHENTICATION

BACKGROUND

Mobile carriers associate a mobile device with a subscriber through a subscriber identity module (SIM) card. A SIM card is a small memory module that contains, among other pieces of information, a unique serial number (ICCID) identifying that SIM card and an international mobile subscriber identity (ISMI) identifying the subscriber. A mobile device vendor installs a SIM card into a mobile device, that vendor is associating that SIM card with the owner of the mobile device when the owner subscribes to a carrier account. Typically, when the mobile device is a smartphone, the carrier account includes a phone number by which calls and SMS messages will be routed to that mobile device.

Occasionally, a subscriber will request that a SIM card installed in his mobile device be reissued. For example, suppose that the subscriber lost his phone and needs a replacement from the mobile device vendor. The mobile phone vendor then associates a new SIM card with another ICCID with the ISMI associated with the subscriber. In a conventional SIM reissuing process, the vendor identifies the subscriber by requiring that the subscriber present information identifying him as that subscriber such as picture identification, credit card number associated with the account, social security number, and the like.

SUMMARY

Unfortunately, there are deficiencies with the above-described conventional SIM reissuing process. For example, a fraudulent subscriber may easily impersonate a genuine subscriber using that required information. The consequences of a fraudulent reissue of a SIM card are dire. Phone calls and SMS messages that should be routed to a genuine subscriber's device will be routed to the fraudulent subscriber's device. If the genuine subscriber employs two-factor authentication to access his accounts, frequently the institution servicing those accounts will grant access upon receiving a secret code that the institution sent to the subscriber's mobile device. This means that the fraudulent subscriber may gain access to such accounts which the genuine subscriber imagines are impregnable to such fraud. Worse still, the genuine user will likely not suspect anything is wrong for a significant period of time because the subscriber needs to suspect something is wrong because of a lack of communication rather than an explicit signal.

In contrast to the conventional SIM reissuing process in which fraudulent subscribers can easily identify themselves as a genuine subscriber and subvert security measures such as two-factor authentication, an improved technique involves employing knowledge based authentication (KBA) to validate a user trying to reissue a SIM card. Along these lines, when a user goes to a mobile device vendor and requests a reissue of a SIM card, the vendor relays that request to an authentication server which in turn sends KBA questions to the user. The KBA questions are based on data available to the mobile carrier to which the genuine subscriber subscribes. Such data may concern information including calls made and received, amount of minutes and data used in a month, and amount billed in particular months. The vendor honors or denies the request to reissue the SIM card based on the answers submitted by the user to the authentication server.

Advantageously, the improved technique makes it far more difficult for a fraudulent subscriber to reissue a SIM card in the name of a genuine user. In this way, KBA plugs a serious hole in two-factor authentication by requiring an account holder to have a certain level of familiarity with his account.

One embodiment of the improved technique is directed to a method of transferring an international mobile subscriber identity (IMSI) of a first subscriber identity module (SIM) card installed in a first device to a second SIM card installed in a second device. The method includes generating, by a knowledge-based authentication (KBA) processor, a set of KBA questions based on data obtained from the first device. The method also includes receiving, at the KBA processor, a request from a user to transfer the IMSI of the first SIM card to the second SIM card. The method further includes providing, by the KBA processor, KBA questions of the set of KBA questions to the user. The method further includes receiving, at the KBA processor, a set of answers to the KBA questions. The method further includes performing, by the KBA processor, a KBA operation serving to produce an authentication result from the set of answers, the authentication result being indicative of a success or failure to authenticate the user.

Additionally, some embodiments of the improved technique are directed to a system constructed and arranged to transfer an international mobile subscriber identity (IMSI) of a first subscriber identity module (SIM) card installed in a first device to a second SIM card installed in a second device. The system includes a network interface, memory, and a controller including controlling circuitry constructed and arranged to carry out the method of transferring an international mobile subscriber identity (IMSI) of a first subscriber identity module (SIM) card installed in a first device to a second SIM card installed in a second device.

Furthermore, some embodiments of the improved technique are directed to a computer program product having a non-transitory computer readable storage medium which stores code including a set of instructions which, when executed by a computer, cause the computer to carry out the method of transferring an international mobile subscriber identity (IMSI) of a first subscriber identity module (SIM) card installed in a first device to a second SIM card installed in a second device.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves employing knowledge based authentication (KBA) to validate a user trying to reissue a SIM card. Along these lines, when a user goes to a mobile device vendor and requests a reissue of a SIM card, the vendor relays that request to an authentication server which in turn sends KBA questions to the user. The KBA questions are based on data available to the mobile carrier to which the genuine subscriber subscribes. Such data concerns information including calls made and received, amount of minutes and data used in a month, and amount billed in particular months. The vendor honors or denies the request to reissue the SIM card based on the answers submitted by the user to the authentication server.

Advantageously, the improved technique makes it far more difficult for a fraudulent subscriber to reissue a SIM card in the name of a genuine user. In this way, KBA plugs a serious hole in two-factor authentication by requiring an account holder to have a certain level of familiarity with his account.

Figure 1:
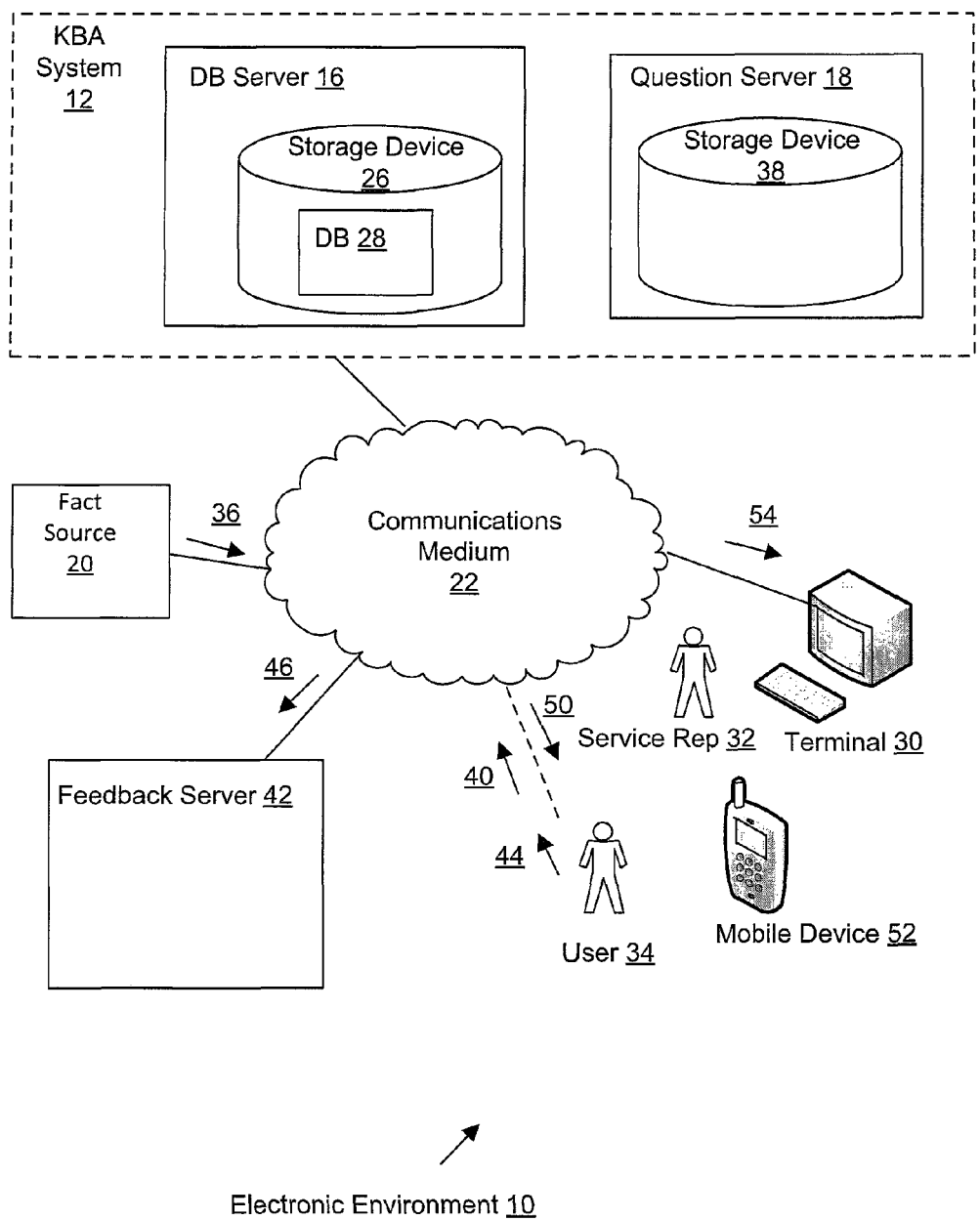
FIG. 1 is a block diagram illustrating an example electronic environment for carrying out the improved technique.

FIG. 1 illustrates an electronic environment 10 for carrying out the improved technique. Electronic environment 10 includes KBA system 12, fact source 20, terminal 30, feedback server 42, and communications medium 22.

Communication medium 22 provides network connections between KBA system 12, fact source 20, terminal 30, and feedback server 42. Communications medium 22 may implement a variety of protocols such as TCP/IP, UDP, ATM, Ethernet, Fibre Channel, combinations thereof, and the like. Furthermore, communications media 22 may include various components (e.g., cables, switches/routers, gateways/bridges, NAS/SAN appliances/nodes, interfaces, etc.). Moreover, the communications medium 18 are capable of having a variety of topologies (e.g., queue manager-and-spoke, ring, backbone, multi drop, point to-point, irregular, combinations thereof, and so on).

Fact source 20 includes various databases (not pictured) in communication with KBA system 12. For example, fact source 20 is a database associated with a mobile service carrier (e.g., Verizon, AT&T, and the like). Fact source 20 is configured to send facts 36 (i.e., data to be used in generating KBA questions) to KBA system 12 over communications medium 18 either at a regular basis (e.g., continuously, nightly, weekly, etc.), or in response to an explicit request.

It should be understood that facts 36 sent by fact source 20 include information collected by the mobile service carrier in the course of providing service to the subscriber. That is, facts 36 may include information about calls made to and from the subscriber, geolocations when the calls were made, and information about the subscriber's account including billing information and amount of data and talk time used in a month.

KBA system 12 is constructed and arranged to generate KBA questions from facts 36. KBA system 12 is also constructed and arranged to send selected KBA questions to a user 34 in response to a request 40 for authentication. KBA system 12 is further constructed and arranged to provide an authentication result to service rep 32 in response to receiving answers to the KBA questions from user 34. KBA server 12 includes a database server 16 and question server 18.

Database server 16 is an electronic system in communication with the fact source 20 and question server 18. Database server 16 includes storage device 26 on which database 28 is stored.

Database 28 stores facts 36 in a common format. Database 28 includes entries, each of which represents a fact 36. The common format is represented by various fields within each entry.

Question server 18 is an electronic system in communication with database server 16 and terminal 30 at a mobile device vendor. Question server 18 includes storage device 38 on which KBA questions generated by question server 18 are stored.

Terminal 30 is a computer used by a vendor to perform tasks such as submitting requests 40 for authentication to KBA system 12, providing KBA questions to user 34, and relaying answers to KBA questions to KBA system 12.

Feedback server 42 is constructed and arranged to receive answers 46 to certain KBA questions ("red-herring" questions) and use machine learning techniques to provide KBA system 12 with improved models for authenticating users.

During operation, fact source 20 sends facts 36 to KBA system 12. Facts 36 include call and account information for subscribers of a mobile carrier. Fact source 20 may send facts 36 to KBA system 12 in any number of ways, e.g., over a secure link, encrypted, via TCP/IP, etc. Upon receiving facts 36, KBA system 12 stores facts 36 within database server 16, in database 28.

It should be understood that facts 36 are characterized by values of a set of parameters which represent fields in database 28. Such parameters include subscriber identifier, carrier identifier, carrier plan, number of SMS messages sent and received in a month, minutes used in a month, length of calls, identifying information of people with whom calls were made, billing information, and the like.

At some point in time (e.g., nightly, weekly, in response to a request), database server 16 sends facts 36 to question server 18 for conversion into KBA questions. In performing such a conversion, question server 18 scans facts 36 for data such as keywords, quantities, and identifiers. Once KBA questions are formed, question server 18 stores KBA questions in storage device for later use.

It should be understood that database server 16 and question server 18, in some arrangements, delete facts and questions that are older than some threshold age (e.g, thirty days). In this way, KBA system 12 is able to minimize the risk that a genuine user might not know the answers to KBA questions because such information has been forgotten.

At some point in time, user 34 sends a request 40, through service rep 32 at a mobile device vendor, to KBA system 12 for authentication. For example, user 34 goes to service rep 32 to get a SIM card reissued due to, e.g., loss of a device. User 34 selects a mobile device (or may already have one in his possession) and requests that the SIM card be reissued so that he may preserve his phone number.

Service rep 32 sends request 40 to KBA system 12. In response, question server 18 selects a set of KBA questions 50 from storage device 38 based on a subscriber identifier and other considerations, e.g., location of the vendor with respect to geolocations expressed in the KBA questions. Once question server 18 selects the KBA questions, KBA server 12 sends those questions to user 34. In some arrangements, KBA questions 50 are seen only by user 34; service rep 32 only knows whether user 34 has been successfully authenticated or not.

It should be understood that, in some arrangements, KBA questions 50 are multiple choice. In this case, question server 18 is also constructed and arranged to produce confounders (i.e., incorrect answers) along with the questions. Question server 18 stores confounders on storage device 38 with KBA questions.

In response to receiving KBA questions 50, user 34 submits answers 44 to KBA server 12. For example, when KBA questions 50 are multiple-choice, user selects a choice from a menu on, e.g., a touch screen on terminal 30. In some arrangements, user 34 has access to a separate kiosk from terminal 30 so that service rep 32 is not privy to any sensitive information.

In response to receiving answers 44 from user 34, KBA system 12 performs an authentication operation on answers 44 and sends result 54 of the operation to service rep 32. In some arrangements, KBA system 12 employs an adaptive authentication system which assigns a risk score to user 34 based on answers 44. Based on results of the authentication operation, KBA system 12 either successfully authenticates user 34 as the genuine subscriber, or fails to authenticate user 34 as such. In the latter case, KBA system 12 may instruct service rep 32 to ask for further proof of identification, i.e., identification used when opening the mobile service account, etc, or to deny user 34 permission to reissue the SIM card.

In some arrangements, KBA system 12 sends certain answers 44 as well as corresponding KBA questions 50. As mentioned above, certain questions are red-herring questions which do not count toward authenticating user 34. (User 34 is unaware of which questions are red herrings.) Because these answers are not used in determining an authentication result, they, along with an authentication result based on other answers, may be used to tune models used in the authentication operation. For example, risk score is based on a Bayesian model that is tuned according to such feedback. Further details of such a mechanism is described below with respect to FIG. 2.

Figure 2:
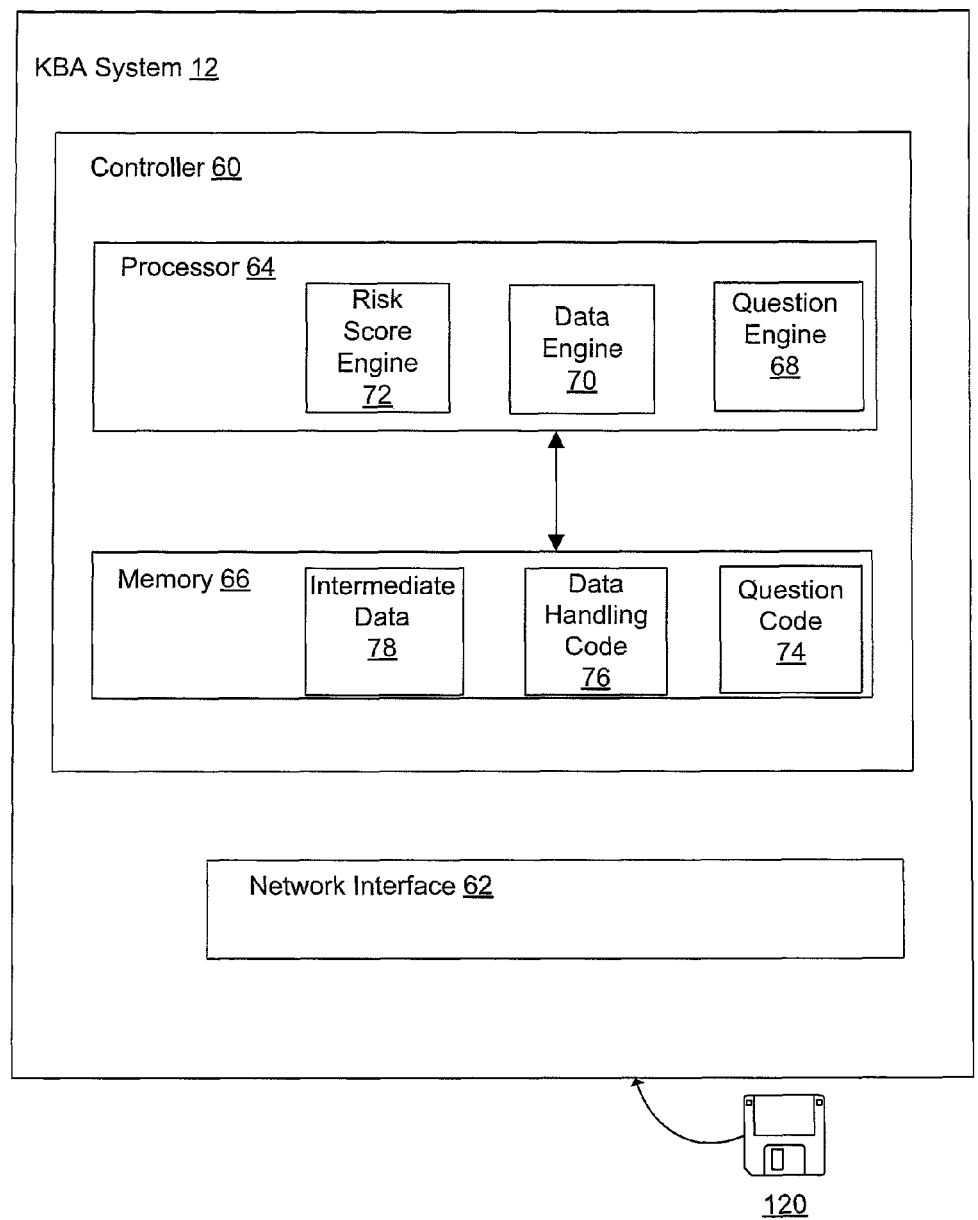
FIG. 2 is a block diagram illustrating an example KBA server within the electronic environment shown in FIG. 1.

FIG. 2 illustrates KBA system 12. KBA system 12 includes controller, which in turn includes processor 64 and memory 66, and network interface 62.

Network interface 62 takes the form of an Ethernet card; in some arrangements, network interface 62 takes other forms including a wireless receiver and a token ring card.

Memory 66 is configured to store code which includes question code 74 configured to generate a set of questions from facts 36 (see FIG. 1) stored in facts database 28 on storage device 26. Questions, in turn, are stored in storage device 38. Memory 66 also includes space for intermediate data 78, in which intermediate results of question building are stored. Memory 66 further includes data handling code 76 for handling facts supplied by fact source 20. Memory 46 generally takes the form of, e.g., random access memory, flash memory or a non-volatile memory.

Processor 64 takes the form of, but is not limited to, Intel or AMD-based MPUs, and can include a single or multi-cores each running single or multiple threads. Processor 44 is coupled to memory 66 and is configured to execute instructions from question code 74 and data handling code 76. Processor 64 includes question engine 68, data engine 70 and risk score engine 72.

It should be understood that risk score engine 72 is constructed and arranged to execute models of risk within an adaptive authentication framework based on answers to questions. In some arrangements, risk score engine 72 is configured to assess the risk of allowing user 34 reissue a SIM card based on other factors such as patterns of answers to questions and time and location of requests for authentication.

In some arrangements, risk score engine 72 is configured to accept feedback from feedback server 42 (see FIG. 1) in the form of adjustments to Bayesian coefficients used as a basis for the authentication model. Risk score engine incorporates these adjusted coefficients into the model and runs the model to compute risk score on new answers. In some arrangements, risk score engine 72 re-runs the adjusted model on existing answers.

Figure 3:
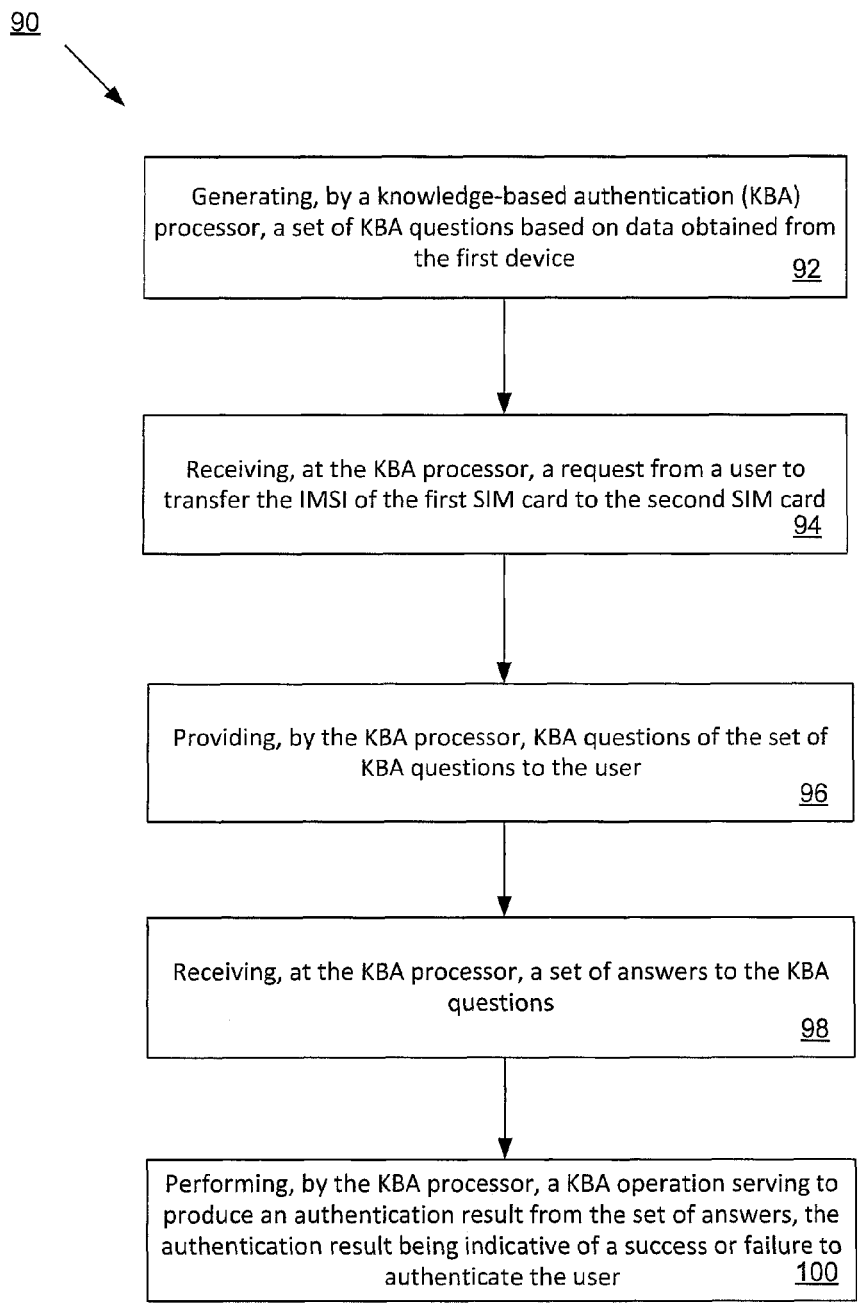
FIG. 3 is a flow chart illustrating an example method of carrying out the improved technique within the electronic environment shown in FIG. 1.

FIG. 3 illustrates a method 90 of transferring an international mobile subscriber identity (IMSI) of a first subscriber identity module (SIM) card installed in a first device to a second SIM card installed in a second device, including steps 92, 94, 96, 98, and 100. In step 92, a set of KBA questions are generated based on data obtained from a first device by a KBA processor, for example, processor 64. In step 94, a request from a user to transfer the IMSI of the first SIM card to the second SIM card is received at the KBA processor. In step 96, KBA questions of the set of KBA questions are provided to the user by the KBA processor. In step 98, a set of answers to the KBA questions are received at the KBA processor. In step 100, a KBA operation serving to produce an authentication result from the set of answers is performed by the KBA processor, the authentication result being indicative of a success or failure to authenticate the user.

While various embodiments of the invention have been particularly shown and described, it will be understood by those skilled in the art that various changes in form and details may be made therein without departing from the spirit and scope of the invention as defined by the appended claims.

For example, while feedback server 42 has been shown to be separate from KBA system 12, in some arrangements, feedback server 42 is part of KBA system 12.

Furthermore, it should be understood that some embodiments are directed to KBA system 12, which is constructed and arranged to transfer an international mobile subscriber identity (IMSI) of a first subscriber identity module (SIM) card installed in a first device to a second SIM card installed in a second device. Some embodiments are directed to a process of transferring an international mobile subscriber identity (IMSI) of a first subscriber identity module (SIM) card installed in a first device to a second SIM card installed in a second device. Also, some embodiments are directed to a computer program product which enables computer logic to transferring an international mobile subscriber identity (IMSI) of a first subscriber identity module (SIM) card installed in a first device to a second SIM card installed in a second device.

In some arrangements, KBA system 12 is implemented by a set of processors or other types of control/processing circuitry running software. In such arrangements, the software instructions can be delivered, within KBA system 12, either in the form of a computer program product 120 (see FIG. 2) or simply instructions on disk or in pre-loaded in memory 66 of KBA system 12, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of transferring an international mobile subscriber identity (IMSI) of a first subscriber identity module (SIM) card installed in a first device to a second SIM card installed in a second device, the method comprising:
   generating, by a knowledge-based authentication (KBA) processor, a set of KBA questions based on data obtained from the first device;
   receiving, at the KBA processor, a request from a user to transfer the IMSI of the first SIM card to the second SIM card;
   providing, by the KBA processor, KBA questions of the set of KBA questions to the user;
   receiving, at the KBA processor, a set of answers to the KBA questions; and
   performing, by the KBA processor, a KBA operation serving to produce an authentication result from the set of answers, the authentication result being indicative of a success or failure to authenticate the user.

2. A method as in claim 1,
   wherein the first device and the second device are each mobile computing devices configured to send data over a mobile network;
   wherein the method further comprises:
      prior to generating the set of KBA questions, receiving the data from the first device from a remote location over the mobile network.

3. A method as in claim 2,
wherein the data includes communications issued from the first device, the communications including values of a set of communications parameters, communications parameters of the set of communications parameters including a communication destination, a communication initiation time, a communication termination time, and a geolocation from where the communication was initiated;
wherein the method further comprises:
storing the values of the set of communications parameters of the communications in a database; and
wherein generating the set of KBA questions includes:
retrieving the values of the set of communications parameters of the communications from the database.

4. A method as in claim 3,
wherein the data further includes information from an account belonging to an owner of the first device, the information including values of a set of account parameters, account parameters of the set of account parameters including a billing amount in a period of time, a number of call minutes used in a period of time, and a number of bytes transferred in a period of time;
wherein the method further comprises:
storing the values of the set of account parameters of the account in a database; and
wherein generating the set of KBA questions further includes:
retrieving the values of the set of account parameters of the account from the database.

5. A method as in claim 3,
wherein questions of the set of KBA questions are presented to the user in a multiple-choice format including a correct choice and confounders;
wherein generating the set of KBA questions further includes:
building a set of confounders from the values of the set of parameters of the communications retrieved from the database, the confounders of the multiple-choice format in which the KBA questions are presented to the user being selected from the set of confounders.

6. A method as in claim 1,
wherein particular questions of the KBA questions provided to the user are red-herring questions configured to provide feedback into a machine learning system;
wherein the method further comprises:
providing answers to the red-herring questions to the machine learning system; and
wherein generating the set of KBA questions includes:
producing the set of KBA questions based on results of the machine learning system.

7. A method as in claim 6,
wherein the machine learning system is part of an adaptive authentication system in which the authentication result is based on a risk score;
wherein performing the KBA operation includes:
generating a value of the risk score based on the set of answers received from the user.

8. An apparatus constructed and arranged to transferring an international mobile subscriber identity (IMSI) of a first subscriber identity module (SIM) card installed in a first device to a second SIM card installed on a second device, the apparatus comprising:
a network interface;
memory; and
a controller including controlling circuitry, the controlling circuitry being constructed and arranged to:
generate, by a knowledge-based authentication (KBA) processor, a set of KBA questions based on data obtained from the first device;
receive, at the KBA processor, a request from a user to transfer the IMSI of the first SIM card to the second SIM card;
provide, by the KBA processor, KBA questions of the set of KBA questions to the user;
receive, at the KBA processor, a set of answers to the KBA questions; and
perform, by the KBA processor, a KBA operation serving to produce an authentication result from the set of answers, the authentication result being indicative of a success or failure to authenticate the user.

9. An apparatus as in claim 8,
wherein the first device and the second devices are each mobile computing devices configured to send data over a mobile network;
wherein the controlling circuitry is further constructed and arranged to:
prior to generating the set of KBA questions, receive the data from the first device from a remote location over the mobile network.

10. An apparatus as in claim 9,
wherein the data includes communications issued from the first device, the communications including values of a set of communications parameters, communications parameters of the set of communications parameters including a communication destination, a communication initiation time, a communication termination time, and a geolocation from where the communication was initiated;
wherein the controlling circuitry is further constructed and arranged to:
store the values of the set of communications parameters of the communications in a database; and
wherein generating the set of KBA questions includes:
retrieving the values of the set of communications parameters of the communications from the database.

11. An apparatus as in claim 10,
wherein the data further includes information from an account belonging to an owner of the first device, the information including values of a set of account parameters, account parameters of the set of account parameters including a billing amount in a period of time, a number of call minutes used in a period of time, and a number of bytes transferred in a period of time;
wherein the controlling circuitry is further constructed and arranged to:
store the values of the set of account parameters of the account in a database; and
wherein generating the set of KBA questions further includes:
retrieving the values of the set of account parameters of the account from the database.

12. An apparatus as in claim 10,
wherein questions of the set of KBA questions are presented to the user in a multiple-choice format including a correct choice and confounders;
wherein generating the set of KBA questions further includes:
building a set of confounders from the values of the set of parameters of the communications retrieved from the database, the confounders of the multiple-choice format in which the KBA questions are presented to the user being selected from the set of confounders.

13. An apparatus as in claim 8,
wherein particular questions of the KBA questions provided to the user are red-herring questions configured to provide feedback into a machine learning system;
wherein the controlling circuitry is further constructed and arranged to:
provide answers to the red-herring questions to the machine learning system; and
wherein generating the set of KBA questions includes:
producing the set of KBA questions based on results of the machine learning system.

14. An apparatus as in claim 13,
wherein the machine learning system is part of an adaptive authentication system in which the authentication result is based on a risk score;
wherein performing the KBA operation includes:
generating a value of the risk score based on the set of answers received from the user.

15. A computer program product having a non-transitory, computer-readable storage medium which stores code to provide a set of questions in a knowledge-based authentication (KBA) system, the code including instructions which, when executed by a computer, causes the computer to:
generate, by a knowledge-based authentication (KBA) processor, a set of KBA questions based on data obtained from the first device;
receive, at the KBA processor, a request from a user to transfer the IMSI of the first SIM card to the second SIM card;
provide, by the KBA processor, KBA questions of the set of KBA questions to the user;
receive, at the KBA processor, a set of answers to the KBA questions; and
perform, by the KBA processor, a KBA operation serving to produce an authentication result from the set of answers, the authentication result being indicative of a success or failure to authenticate the user.

16. A computer program product as in claim 15,
wherein the first device and the second devices are each mobile computing devices configured to send data over a mobile network;
wherein the code includes further instructions which, when executed by the computer, cause the computer to:
prior to generating the set of KBA questions, receive the data from the first device from a remote location over the mobile network.

17. A computer program product as in claim 16,
wherein the data includes communications issued from the first device, the communications including values of a set of communications parameters, communications parameters of the set of communications parameters including a communication destination, a communication initiation time, a communication termination time, and a geolocation from where the communication was initiated;
wherein the code includes further instructions which, when executed by the computer, cause the computer to:
store the values of the set of communications parameters of the communications in a database; and
wherein generating the set of KBA questions includes:
retrieving the values of the set of communications parameters of the communications from the database.

18. A computer program product as in claim 17,
wherein the data further includes information from an account belonging to an owner of the first device, the information including values of a set of account parameters, account parameters of the set of account parameters including a billing amount in a period of time, a number of call minutes used in a period of time, and a number of bytes transferred in a period of time;
wherein the code includes further instructions which, when executed by the computer, cause the computer to:
store the values of the set of account parameters of the account in a database; and
wherein generating the set of KBA questions further includes:
retrieving the values of the set of account parameters of the account from the database.

19. A computer program product as in claim 17,
wherein questions of the set of KBA questions are presented to the user in a multiple-choice format including a correct choice and confounders;
wherein generating the set of KBA questions further includes:
building a set of confounders from the values of the set of parameters of the communications retrieved from the database, the confounders of the multiple-choice format in which the KBA questions are presented to the user being selected from the set of confounders.

20. A computer program product as in claim 15,
wherein particular questions of the KBA questions provided to the user are red-herring questions configured to provide feedback into a machine learning system;
wherein the code includes further instructions which, when executed by the computer, cause the computer to:
provide answers to the red-herring questions to the machine learning system; and
wherein generating the set of KBA questions includes:
producing the set of KBA questions based on results of the machine learning system.

* * * * *